March 11, 1930.       J. W. CORNELIUS       1,750,508
METHOD FOR CONDITIONING GRAIN
Filed June 23, 1928    2 Sheets-Sheet 1

INVENTOR.
John W. Cornelius
BY
ATTORNEY

March 11, 1930. J. W. CORNELIUS 1,750,508
METHOD FOR CONDITIONING GRAIN
Filed June 23, 1928 2 Sheets-Sheet 2

INVENTOR.
John W. Cornelius
BY
ATTORNEY

Patented Mar. 11, 1930

1,750,508

UNITED STATES PATENT OFFICE

JOHN W. CORNELIUS, OF KANSAS CITY, MISSOURI, ASSIGNOR TO GENERAL MILL EQUIPMENT COMPANY, OF KANSAS CITY, MISSOURI, A CORPORATION OF MISSOURI

METHOD FOR CONDITIONING GRAIN

Application filed June 23, 1928. Serial No. 287,816.

My invention relates to grain treating methods and apparatus and has for its principal objects to reduce the time required for tempering grain, to heat superficially moistened grain under pressure for forcing moisture rapidly into the grain kernels, and to pass grain through a heated and sealed conduit in the presence of moisture and under pressure whereby the moisture may be forced into the kernels with relative rapidity.

A further object is to introduce treating agents such as bleaching and smut spore-destroying substances into a mass of moist grain while the mass is subject to heat and pressure whereby the treating agent may be forced into the interior portions of the kernels.

Particular objects of the invention include the provision of means for sealing moist grain in a conduit through which it is being passed, means for increasing the pressure in the conduit, means for introducing pressure and treating agents to grain, and means for reducing the temperature of grain after treatment by heat.

In accomplishing these and other objects of the invention I have provided improved details of structure, the preferred forms of which are illustrated in the accompanying drawings, wherein.

Figure 1:
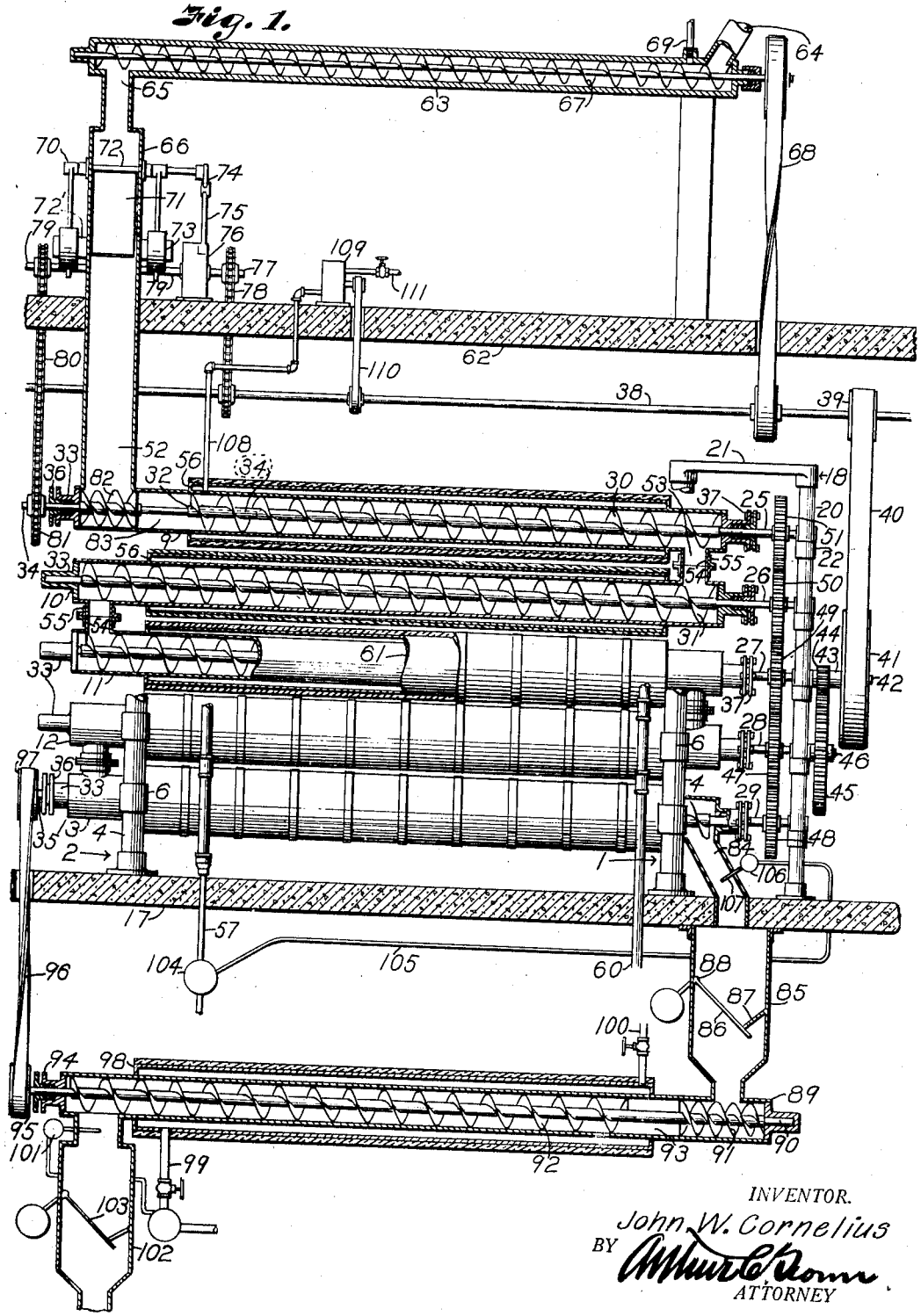
Fig. 1 is a side elevation partly in section of apparatus adapted for treating grain according to my method.
Figure 2:
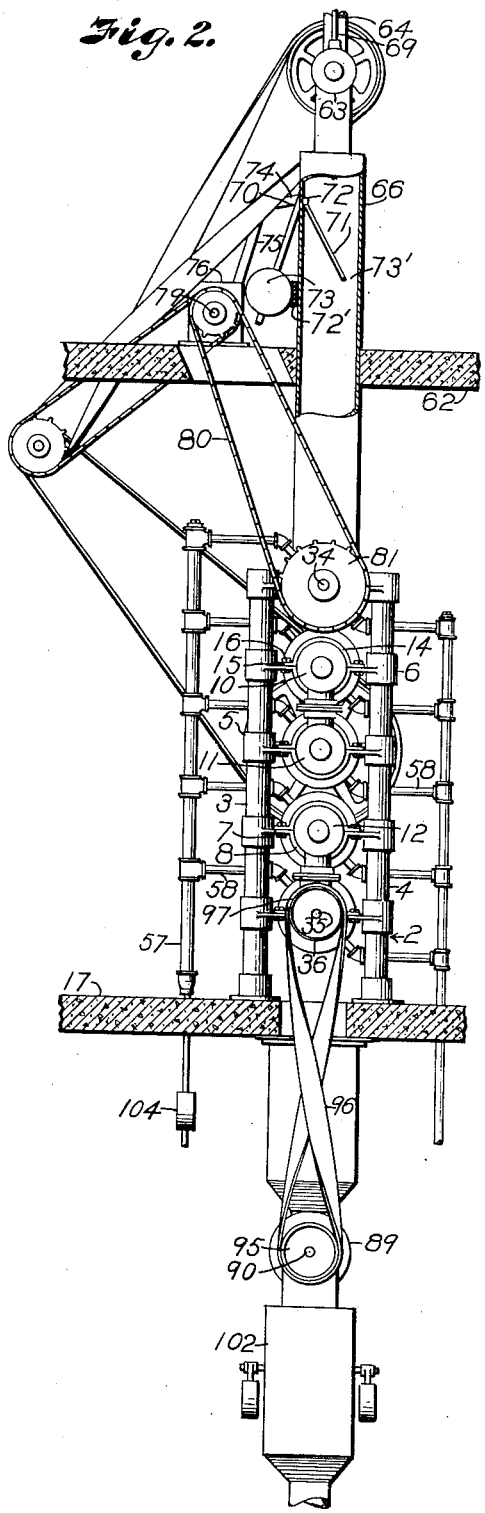
Fig. 2 is an end elevation of the apparatus partly in section and partly broken away.
Figure 3:
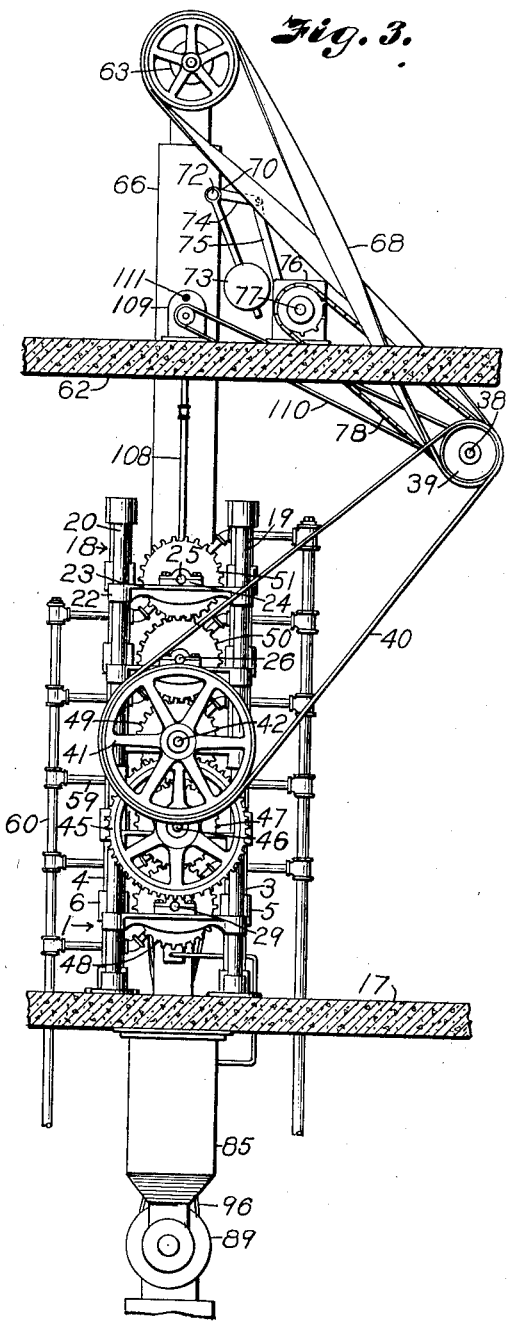
Fig. 3 is a similar view of the opposite end of the apparatus.

Referring in detail to the drawings:

1 and 2 designate laterally spaced frames, each comprising vertical spaced posts 3 and 4 such as pipe provided with vertically spaced pairs of sleeves 5 and 6 having inwardly extending bracket arms 7 connected by depending strap-like loops 8, the loops receiving the ends of a plurality of cylinders herein represented as five in number and designated 9 to 13, and later more particularly described. Band-like clamps 14 having ends 15 fixed to the arms 7 by bolts 16 cooperate with the loops to secure the cylinders to the frames, which are supported by a platform 17.

A bearing-supporting frame or rack 18 is also supported by the platform 17 adjacent the cylinder-supporting frame 1 and comprises posts 19 and 20 braced from the posts 3 and 4 of the frame 1 by bars 21, and having sleeves 22 connected by brackets 23 provided with shaft bearings 24 for rotatably supporting the outer ends of shafts 25, 26, 27, 28 and 29 extending into the several cylinders. The shaft 25 is provided with a relatively short spiral ribbon 30, and the other shafts with spiral ribbons 31 extending substantially the lengths of the cylinders, for moving grain through the cylinders as later described. The spiral conveyors are formed in the usual manner from pipe, such as 32, on which ribbon is extended, and into which shafts are inserted.

The inner ends of the shafts are journaled in bearings formed by reduced ends 33 of the cylinders, the shafts 25 and 29 having extensions 34 and 35 respectively which project through stuffing boxes 36 for purposes later described, the extension 34 of the shaft 25 being a separate shaft rotatable in the supporting pipe 32 of the shaft 25, while the extension 35 is integral with the shaft 29. The outer ends of the several shafts extend through similar stuffing boxes, such as 37, on the outer ends of the cylinders.

The shafts mentioned are rotated for moving grain through the cylinders from a line shaft 38 provided with a small pulley 39 over which runs a belt 40 that rotates a large pulley 41 on an extension 42 of the shaft 27 that extends into the middle cylinder 11. The pulley is keyed to a sleeve 43 that rotates freely on the shaft extension, and a small pinion 44 keyed to the sleeve is in mesh with a large gear 45 keyed to the extension 46 of the shaft 28 that extends into the cylinder 12, to rotate said shaft 28. Motion is transmitted from a gear 47 keyed to the shaft 28 to gears 48 and 49 on adjacent shafts, and through gear 49 to gears 50 and 51 on shafts 26 and 25. The gear train described provides also for reduction of speed from the line shaft to the spiral conveyors.

Each of the cylinders is provided with an upwardly opening inlet port 52 adjacent one end and a downwardly opening outlet port 53 adjacent the other end, the outlet of one cylinder registering with the inlet of the cylinder below it, and cylindrical flanges 54 around the ports bridging the spacing between the cylinders and being joined in sealed relation by annular flanged rings 55.

Each cylinder is provided with a steam jacket 56. Steam is delivered through a supply pipe 57 having branches 58 into the several jackets, and passes therefrom through branches 59 to an outlet pipe 60. The steam jackets are covered with insulating jackets 61, to retain the heat for conduction through the cylinders to the grain therein.

Supported on a platform 62 above the platform 17 is a cylindrical grain-delivering conduit 63 having an inlet spout 64 at one end and a mouth 65 at the opposite end connected to a vertical conduit 66 for gravity delivery of grain to the inlet of the upper cylinder 9. The conduit 63 is similar to the cylinders previously described, and a conveyor 67 therein is rotated by a belt 68 from the line shaft 38 for moving grain through the conduit.

The grain delivered to the conduit 63 is preferably moistened by introduction of fluid through a pipe 69 inserted in the conduit adjacent the inlet 64.

Means for sealing the grain in its passage through the conduit and cylinders and retaining heat vapor and moisture therein are provided, and include first a weighted gate valve 70 comprising a plate 71 pivotally supported on a bar 72 from the wall of the conduit 66, the gate valve being adapted to control the withdrawal of grain from the conduit 66 for assuring the maintenance of a sealing body of grain in the conduit, as presently described. Weights 73 suspendingly fixed to the bar 72 retain the plate in normally extended oblique position across the conduit 66 against the influence of grain falling from the conduit 63, the weights being stopped by a bar 72' to space the free end of the plate from the wall of the conduit and provide a channel 73' through which grain falling on the plate may pass downwardly.

When grain accumulates in the conduit 66 sufficiently so that free flow through the channel 73' is checked, the grain later discharged from the conduit 63 lies on the plate 71, and the weight of the mass of grain above the lower free edge of the plate causes the plate to swing and rotate the bar 72, and to rock an arm 74 attached to the bar 72, the arm actuating a link 75 which in turn actuates a speed regulator 76.

The mass of the weights 73 may be provided suitably to the predetermined weight of falling grain for permitting the grain to flow from the plate through the channel, and for yielding under predetermined weights of piled-up grain for suitable control of the speed regulator.

The speed regulator 76 is interposed between a shaft 77 rotated through a chain 78 from the line shaft 38 and a shaft 79 moving a chain 80 that runs over a sprocket 81 on the short extension shaft 34 of the shaft 25 that extends rotatably in the inner end of the spiral-supporting pipe 32 of said shaft. The shaft 34 supports and rotates a short conveyor 82 positioned to receive grain delivered to the cylinder 9 through the conduit 66, and adapted to move grain away from the conduit 66.

The conveyor 82 extends across the inlet of the cylinder 9 and is spaced from the inner end of the conveyor within the cylinder, the spacing being designated 83 and representing an area within which the moistened grain is compacted to provide a seal at that end of the cylinder. The compacting of the grain in said area is effected by the differential speed of rotation of the conveyor 82 which is controlled by the regulator 76, and that on the shaft 25, which moves at constant speed. The screw conveyor 82 rotates proportionately to the position of the gate valve 70 and moves grain more slowly when a small amount of grain is being delivered, to maintain the seal.

When grain piles up on the plate 71, the plate pivots to rock the link and influence the regulator to increase the speed of the conveyor 82, the speed of the conveyor being proportionate to the mass of grain bearing against the plate. When delivery of grain to the conduit 66 is reduced or suspended, and the plate 71 is relieved of weight of supported grain, the plate may swing toward retracted position, and actuate the regulating mechanism 76 to reduce the speed of the conveyor 82 or suspend actuation thereof.

Grain moved through the series of cylinders, and heated during its passage, is delivered through a chute 84 from the outlet of the lowest cylinder to a hopper 85 containing a pivoted weighted gate plate 86 that cooperates with an inclined shelf 87 to close and seal the hopper when relieved of the weight of grain. The weight is adapted to restrain the plate from pivoting to release grain, except when a predetermined amount of grain has accumulated on the plate and shelf. The gate is pivoted in the wall of the conduit at 88. The hopper discharges into a cooling cylinder 89 similar to the cylinders above described, and provided with a shaft 90 having a short double-flighted conveyor spiral 91 keyed thereto adjacent the inlet and spaced from the main conveyor spiral 92 by a space 93.

The flights of the short spiral conveyor have the same pitch as the flights of the spiral 92, the double-flighted character of the short conveyor and the extent of the space 93 providing for the accumulation of a cylindrical sealing body of grain in said space for advancement to the normally flighted conveyor 92. The opposite end of the shaft 90 projects through a stuffing box 94 and is provided with a pulley 95 over which a belt 96 runs from a pulley 97 on the extended end 35 of the shaft 29, whereby the shaft in the cooling cylinder is rotated from the gear train and the line shaft.

An insulated sealed jacket 98 surrounding the cooling cylinder is supplied with a refrigerant through an inlet pipe 99, the refrigerant departing through an outlet 100. The degree of refrigeration is controlled by the temperature of the departing grain, as indicated by the thermostatic device 101 inserted to the discharge hopper.

Grain is discharged from the cooling cylinder to a chute 102 provided with a sealing weighted gate 103, and moves therefrom to milling apparatus.

A thermostatic pressure regulator 104 is interposed in the steam line for controlling the delivery of steam to the jackets 56, a connecting line 105 connecting the regulator with a thermostatic device 106 having a member 107 inserted into the discharge chute 84 for contact with grain passing from the lowest cylinder 13.

I further provide means for introducing a treating substance to the grain while it is subject to heat and moisture comprising a tube 108 inserted into one of the cylinders, for example, cylinder 9, and supplied with the substance by a pump 109 actuated through a belt 110 from the line shaft 38, a valved conduit 111 indicating a source for the substance. Fluid such as air may be introduced to the cylinder through the pump, for providing an additional pressure agent, and to be expanded by the heat conducted through the walls of the cylinder.

In one illustrative use of the apparatus, the material, for example, wheat, is delivered through the inlet 64 to the primary conveyor, and a moistening agent is introduced to the wheat adjacent the inlet. The wheat falls from the primary conveyor through the vertical conduit to the short conveyor in the cylinder 9, is advanced through the space 83 into contact with the spiral conveyor ribbon 30 therein, the differential speed of the two conveyors regulated by the operation of the gate 70 providing for a compacted and sealing mass of wheat in said space.

The wheat passes from one cylinder to the next, and during its passage is heated by the steam circulating through the jackets to a degree suitable for the particular purpose, for example, to a temperature below that at which injury would result to gluten, and 132° being mentioned as a suitable temperature for an instance of tempering. The heat expands air associated with the wheat, and the pressure thus generated causes the moisture on the surface of the wheat berries to penetrate rapidly into the interior of the berries, and thus in a relatively short period condition the whole berries for grinding, whereas only the hull would be moistened by ordinary tempering processes in a similar period.

Should the pressure created by the expansion of the air normally associated with a mass of material in the cylinders be deemed insufficient, a pressure agent, for example, more air, may be admitted through the tube 108, and it may be delivered under pressure by the pump 109. The tube is also adapted for conducting any desired treating agent to the cylinders, for action on the material.

The outlet from the series of cylinders is sealed by means similar to that which seals the inlet. The thermostatic control for the heating agent is shown as preferably actuated by the changes in temperature of the material as it leaves the heated cylinders.

What I claim and desire to secure by Letters Patent is:

1. A method of treating grain including moistening the grain, enclosing the moist grain, sealing the grain in the enclosure, and applying heat to the enclosed grain for building up pressure to drive the vapor into the grain kernels.

2. The method of tempering material including moistening the material, passing the moistened material through a sealed conduit, and heating the material during its passage to cause air mingled with the material to expand and press the moisture into the material.

3. The method of tempering grain including passing the grain through a conduit, sealing the grain in the conduit, and heating the grain to cause moisture on the grain to vaporize and penetrate the grain berries.

4. The method of tempering grain including moistening the grain berries, passing the moistened berries through a conduit, sealing the conduit to retain air, and heating the conduit to cause the air to expand and urge the moisture to penetrate the berries.

5. The method of tempering grain including passing the grain through a conduit, sealing the conduit to retain vapors, introducing a treating agent into the conduit, and heating the conduit to cause the treating agent to penetrate the grain berries.

6. The method of treating material including passing the material through a conduit, sealing the conduit to retain vapors, heating the conduit to vaporize the moisture, and regulating the heat according to the temperature of material at a selected position in the conduit.

7. The method of tempering grain including applying moisture to the grain kernels, passing the moist kernels through a conduit, sealing the conduit to retain vapors, heating the conduit to vaporize the moisture and create pressure in the conduit and cause the moisture to penetrate the grain kernels, and introducing a treating agent to the conduit during the moisture vaporizing step.

8. The method of conditioning grain for milling comprising passing the grain through a series of conduits, sealing the grain during its passage through the conduits to retain vapor, heating one of the conduits to generate pressure from the vapor, and cooling another of the conduits to reduce the temperature of the grain for delivery for milling.

9. The method of conditioning grain kernels for milling, including passing the grain through a conduit, sealing the conduit to retain gas, introducing a gas to the grain, associating a treating substance with the grain, and heating the conduit to expand the gas for creating pressure to drive particles of said substance into the grain kernels.

10. The method of conditioning grain for milling, including passing the grain through a conduit in the presence of heat and vapor to generate pressure from the vapor, and cooling the grain after delivery from the heating conduit.

11. The method of conditioning material including passing the material into a container, sealing the container to retain vapors, introducing a conditioning agent into the container, and heating the contents of the container to cause the conditioning agent to penetrate the grain berries.

In testimony whereof I affix my signature.

JOHN W. CORNELIUS.